a mixture of 10.2 parts of methylamine hydrochloride

2,932,667

PREPARATION OF MONOTHIOOXAMIDES

Richard Parke Welcher, Old Greenwich, Conn., assignor to American Cyanamid Company, New York, N.Y., a corporation of Maine No Drawing. Application October 18, 1956
Serial No. 616,589

4 Claims. (Cl. 260—561)

This invention relates to novel N-alkyl substituted monothiooxamides and to a process for preparing the same. More particularly, it relates to monothiooxamides having the general formula:

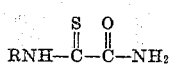

where R is an alkyl substituent. Illustrative of the latter are, for example, methyl, ethyl, butyl, pentyl, decyl and dodecyl.

N-alkyl substituted monothiooxamides are new as a class. They have been found to possess good activity as vulcanization accelerators for synthetic elastomers of the "neoprene" type. To the present, however, the latter class of N-alkyl monothiooxamides has not been employed for this or any other purpose, in view of the fact that the monothiooxamides as previously defined have not been prepared prior to this invention. The reason for this situation is apparently due to the fact that the substituted monothiooxamides are prepared from monothiooxamide which has been newly synthesized, and more particularly described in my copending application for United States Letters Patent, Serial No. 604,622, filed on August 17, 1956. The reaction involved therein is one between cyanoformamide and hydrogen sulfide.

An object of the invention, therefore, is to prepare a new class of N-alkyl substituted monothiooxamides as previously defined. A further object of the invention is to provide a new class of monothiooxamides.

It has been discovered that monothiooxamide can be reacted with a primary alkylamine to produce N-alkyl substituted monothiooxamides in which an alkyl group replaces the hydrogen of the amino group adjacent to the

group. It is an advantage of the invention that the reaction may be carried out over a wide range of reaction conditions, such as for example, temperature, time and the use of an inert solvent medium. For example, a good practice is to employ a temperature range from about 40° C. to about 100° C. In the lower part of this temperature range, not more than about six hours is sufficient to complete the reaction. At the upper end of the temperature range, ten minutes and less is sufficient to complete the reaction.

The process wherein the reaction between monothiooxamide and a primary alkylamine is carried out, may more smoothly take place in the presence of a polar solvent such as for example, alcohol, acetonitrile, water and ether.

The following examples are given by way of illustration and are not to be construed as being limitative of the invention. Unless otherwise stated, the parts are by weight.

Example 1

A mixture of 10.2 parts of methylamine hydrochloride (0.15 mole), 10.4 parts of thiooxamide (0.10 mole), 40 parts of water and 6 parts of sodium hydroxide dissolved in 20 parts of water is charged to a suitable flask equipped with reflux condenser, stirrer and thermometer. The mixture is heated at 72° C.–82° C. for thirty minutes. Ammoniacal fumes evolve from the clear yellow solution. The contents in the flask are cooled to 25° C. and are then acidified with 6 N hydrochloric acid. Resultant slurry is treated with ether to obtain an ether solution which is washed with sodium bicarbonate solution, dried and then treated to strip any ether. A yellow crystalline residue is obtained after recrystallization from ethylene dichloride and water. This residue, N-methylthiooxamide, melted at 121° C.–122° C. Its nitrogen and sulfur contents are 23.97% and 27.31% respectively, as compared with the calculated values of 23.71% N and 27.13% S.

Example 2

To a slurry of 0.04 mole of monothiooxamide and 20 ml. of water is added 0.05 mole of n-butylamine in 5 ml. of water. The thiooxamide dissolves immediately and the solution is heated in the apparatus of the preceding example at 70° C. for one and one half hours. A second liquid phase appears after fifteen minutes of heating. After cooling, the product is obtained by acidification with dilute hydrochloric acid followed by extraction with ether. The ether solution is dried and distilled. 2.5 grams of a golden distillate was obtained. It had a boiling point of 140° C.–143° C. at 9 mm. Hg pressure, a melting point of 21° C.–24° C., and a refractive index $(n_D^{25})$ of 1.5565. The yield of N-n-butylmonothiooxamide is 38% of the theoretical (based on the monothiooxamide).

Example 3

To the apparatus of Example 1 is added 31.3 parts of acetonitrile, 5.2 parts of thiooxamide, 12.2 parts of laurylamine hydrochloride and sodium hydroxide solution prepared by dissolving 2.2 parts of the caustic in 7 parts of water. This mixture is heated for 20 minutes at 70° C.–77° C., cooled to room temperature, acidified with 12 N hydrochloric acid and extracted with ether. The ether extract gave N-n-dodecylthiooxamide in 65% yield. After recrystallization from hexane and acetonitrile, it melted sharply at 69° C.–70° C. The nitrogen and sulfur values calculated for $C_{14}H_{28}N_2SO$ are 10.28% and 11.77%, respectively. Upon analysts, it is found that the nitrogen and sulfur values, respectively, are 10.50% and 11.45%.

As previously stated, the products of the invention find utility as vulcanization accelerators. An example of such utility is presented below.

Example 4

Two batch mixtures are prepared. One batch comprised the following:

Neoprene type W _____ 100
Phenyl-beta-naphthylamine _____ 2
Stearic acid _____ 0.5
Light calcined magnesia _____ 2
Semi reinforcing furnace black _____ 29
Zinc oxide _____ 5
Accelerator (product of Ex. 2) _____ 0.5

Another batch comprised the above except that no accelerator was added.

Each of the batches are thoroughly mixed and test sheets are formed. These are cured for twenty minutes at 153° C., and their tensile strength, modulus and percent elongation determined. The results of these tests are tabularized below:

|  | Modulus at 300% | Tensile (p.s.i.) | Percent Elongation |
| --- | --- | --- | --- |
| No accelerator | 775 | 2,900 | 730 |
| Product of Ex. 2 | 1,275 | 3,050 | 600 |

From the above data, it becomes evident that the presence of accelerator greatly enhances the physical properties of neoprene.

I claim:

1. A new composition of matter having the general formula:

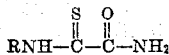

in which R is alkyl having from 1 to 12 carbon atoms.
2. A product of claim 1 in which R is methyl.
3. A product of claim 1 in which R is n-butyl.
4. A product of claim 1 wherein R is dodecyl.

References Cited in the file of this patent

UNITED STATES PATENTS 2,772,309    Doerner _____ Nov. 27, 1956

OTHER REFERENCES

Reissert et al.: Deutsche Chemische Gesellschaft (Berichte), vol. 57, pp. 981–989 (1924).

Reissert: Deutsche Chemische Gesellshaft, vol. 37, pp. 3708–3733 (1904).

Atkinson: Journal of the Chemical Society (London), vol. 105, pp. 1290–1296 (1914).